(12) United States Patent
Thompson et al.

(10) Patent No.: US 10,923,910 B2
(45) Date of Patent: Feb. 16, 2021

(54) SYSTEMS AND METHODS FOR ACCEPTING VARIABLE INPUT POWER FROM AN EXTERNAL POWER SOURCE

(71) Applicant: Dell Products L.P., Round Rock, TX (US)

(72) Inventors: Rick C. Thompson, Cedar Park, TX (US); Merle Jackson Wood, III, Round Rock, TX (US); Mohammad Hijazi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 16/172,287

(22) Filed: Oct. 26, 2018

(65) Prior Publication Data

US 2019/0067938 A1    Feb. 28, 2019

Related U.S. Application Data

(62) Division of application No. 14/313,663, filed on Jun. 24, 2014, now Pat. No. 10,148,087.

(51) Int. Cl.
| | |
|---|---|
| *H02J 1/00* | (2006.01) |
| *G05F 1/46* | (2006.01) |
| *G06F 1/26* | (2006.01) |
| *H02J 7/34* | (2006.01) |
| *H02J 7/00* | (2006.01) |

(52) U.S. Cl.
CPC .............. *H02J 1/00* (2013.01); *G05F 1/46* (2013.01); *G06F 1/26* (2013.01); *H02J 7/342* (2020.01); *H02J 7/0063* (2013.01); *H02J 2007/0067* (2013.01)

(58) Field of Classification Search
CPC .. H02J 1/00; H02J 7/342; H02J 7/0063; H02J 2007/0067; G06F 1/26; G05F 1/46
See application file for complete search history.

(56) References Cited

U.S. PATENT DOCUMENTS

| | | |
|---|---|---|
| 6,981,895 B2 | 1/2006 | Potega |
| 2005/0242786 A1 | 11/2005 | Sawyers et al. |
| 2011/0102136 A1* | 5/2011 | Nakashima ........ H04N 5/23241 340/5.8 |
| 2015/0058501 A1 | 2/2015 | Watanabe et al. |
| 2015/0198989 A1 | 7/2015 | Hayter |

* cited by examiner

*Primary Examiner* — Daniel J Cavallari
(74) *Attorney, Agent, or Firm* — Jackson Walker L.L.P.

(57) ABSTRACT

In accordance with embodiments of the present disclosure, an information handling system may include at least one information handling resource and a power system for delivering electrical energy to the at least one information handling resource. The power system may include a battery and a direct-current (DC) input for receiving a DC power source for delivering electrical energy to the at least one information handling resource and charging the battery. The power system may be configured to, based on at least one of an operational state the battery and a power mode of the information handling system, configure an input power draw limit via the DC input.

6 Claims, 3 Drawing Sheets

SYSTEMS AND METHODS FOR ACCEPTING VARIABLE INPUT POWER FROM AN EXTERNAL POWER SOURCE

The present patent application is a divisional of U.S. patent application Ser. No. 14/313,663, filed Jun. 24, 2014, the entirety of which is hereby incorporated by reference.

TECHNICAL FIELD

The present disclosure relates in general to information handling systems, and more particularly to sensing a current associated with a voltage regulator in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

External batteries for use with information handling systems are becoming increasingly popular. Such external batteries often couple to a direct-current (DC) power input of an information handling system and emulate the behavior of an alternating current-to-direct current (AC/DC) adapter for supplying power to an information handling system. Thus, in situations in which an AC power source is not available to power and/or charge an information handling system, a user may alternatively couple an external battery to the information handling system in lieu of the AC/DC adapter to provide power to operate and/or charge the information handling system.

Many information handling systems are configured such that they receive from an AC/DC adapter, in addition to electrical energy for powering the information handling system, a signal indicating the power delivery capabilities of the AC/DC adapter. Such signal is generally over a unidirectional communication pathway that permits communication of signals from the AC/DC adapter to the information handling system, but not vice versa. Thus, the information handling system may not have a mechanism to actively poll the AC/DC adapter to acquire updated power delivery capabilities, nor would it often need to, as the power delivery capabilities of an AC/DC adapter typically remain static. However, the power delivery capabilities of an external battery emulating an AC/DC adapter may vary over time as a function of one or more factors including the external battery's state of charge, state of health, temperature, and/or other factors, and existing approaches do not adequately provide a manner in which an external battery may communicate dynamically changing power delivery capabilities to the information handling system.

SUMMARY

In accordance with the teachings of the present disclosure, the disadvantages and problems associated with current sensing in a voltage regulator have been reduced or eliminated.

In accordance with embodiments of the present disclosure, an information handling system may include at least one information handling resource and a power system for delivering electrical energy to the at least one information handling resource. The power system may include a battery and a direct-current (DC) input for receiving a DC power source for delivering electrical energy to the at least one information handling resource and charging the battery. The power system may be configured to, based on at least one of an operational state the battery and a power mode of the information handling system, configure an input power draw limit via the DC input.

In accordance with these and other embodiments of the present disclosure, a method may include determining if a battery integral to an information handling system is in a diminished state. The method may also include configuring an input power draw limit of the information handling system in accordance with a continuous power rating associated with information communicated from the DC power source via the DC input if the battery is not operating in the diminished state. The method may further include configuring the input power draw limit in accordance with a nominal continuous power rating of the DC power source if the battery is operating in the diminished state.

In accordance with these and other embodiments of the present disclosure, an external battery and a controller. The external battery may be configured to deliver electrical energy to an information handling system via a direct-current input of the information handling system. The external battery may include an output port for delivering the electrical energy to the information handling system and for communicating an indication to the information handling system regarding the electrical energy delivery capacity of the external battery. The controller may be configured to control the indication by selecting a mode of operation from among a plurality of modes of operation of the external battery based on one or more operating conditions associated with the external battery and, when changing selection of the mode of operation from one mode of operation to another mode of operation, reinitialize the external battery in order to cause the output port to communicate an indication that the external battery is capable of delivering electrical energy in accordance with the mode of operation.

In accordance with these and other embodiments of the present disclosure, a method may include selecting a mode of operation of an external battery from among a plurality of modes of operation of the external battery based on one or more operating conditions associated with the external battery and, when changing selection of the mode of operation from one mode of operation to another mode of operation, reinitializing the external battery in order to cause an output port of the external battery to communicate an indication that the external battery is capable of delivering electrical energy in accordance with the mode of operation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow chart of an example method for communicating a signal indicative of a mode of operation of an external battery, in accordance with embodiments of the present disclosure.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
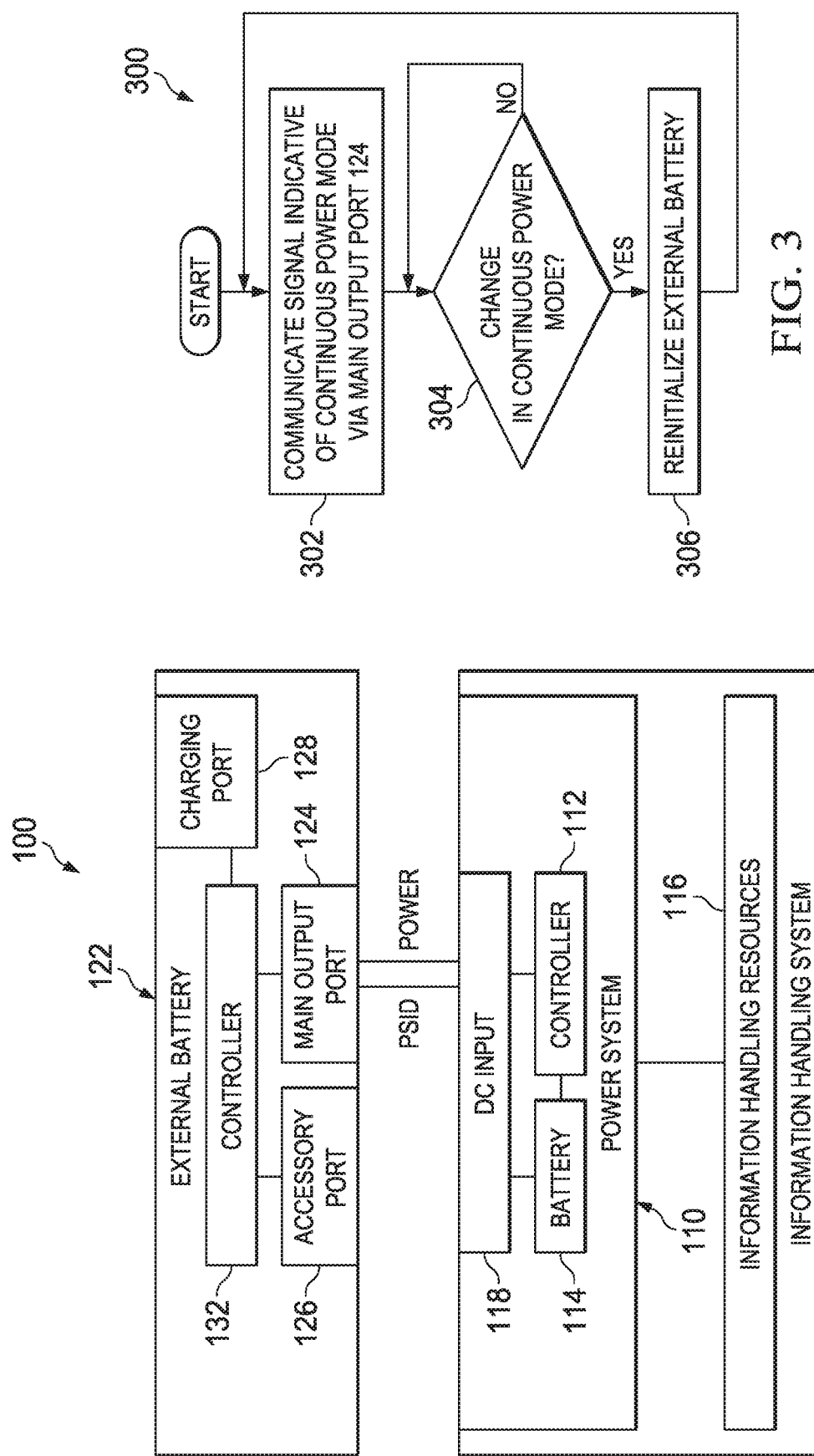
FIG. 1 illustrates a block diagram of an example system including an information handling system and an external battery, in accordance with embodiments of the present disclosure.

FIG. 1 illustrates a block diagram of an example system 100 including an information handling system 102 and an external battery 122 for providing electrical energy to information handling system 102, in accordance with embodiments of the present disclosure.

In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a power system 110 and one or more information handling resources 116.

Generally speaking, power system 110 may include any system, device, or apparatus configured to supply electrical current to one or more information handling resources 116. For example, power system 110 may include any system, device, and/or apparatus operable to supply direct current (DC) electrical power to one or more information handling resources. DC power sources may include a battery 114 and/or an AC/DC adapter (or a device emulating such an adapter) that may couple to DC input 118 and convert 120- or 240-volt (or any other suitable voltage) alternating current supplied by a utility company to a regulated lower voltage DC power source. In addition, an AC/DC adapter (or a device emulating such an adapter) may also charge a battery while supplying power to information handling system 102.

As shown in FIG. 1, power system 110 may include a controller 112, a battery 114, and a DC input 118. Controller 112 may include any system, device, or apparatus configured to control and manage receipt of electrical energy from a device (e.g., AC/DC adapter or a device emulating such an adapter) coupled to DC input 118, charging of battery 114, delivery of electrical energy from battery 114 to information handling resources 116, and/or deliver of electrical energy from DC input 118 to information handling resources 116. Controller 112 may be implemented using, without limitation, a microprocessor, microcontroller, digital signal processor (DSP), application specific integrated circuit (ASIC), or any other digital or analog circuitry configured to interpret and/or execute program instructions and/or process data.

Battery 114 may comprise any system, device, or apparatus comprising of one or more electrochemical cells that convert stored chemical energy into electrical energy for delivery to information handling resources 116, as well as recharge in response to electric current delivered to battery 114, which may reverse the chemical reactions that occur during conversion of the stored chemical energy into electrical energy.

DC input 118 may include any system, device, or apparatus configured to couple an AC/DC adapter (or a device emulating such adapter) to information handling system 102 such that the AC/DC adapter (or the device emulating such adapter) may deliver electrical energy to power system 110 for powering information handling resources 116 and/or recharging battery 114.

External battery 122 may comprise any system, device, or apparatus comprising of one or more electrochemical cells that convert stored chemical energy into electrical energy for delivery to devices electrically coupled to main output port 124 and/or accessory port 126. As shown in FIG. 1, external battery 122 may include a main output port 124, one or more accessory ports 126, a charging port 128, and a controller 132.

Main output port 124 may comprise any system, device, or apparatus configured to output electrical energy (e.g., as showed by connection labeled "POWER" in FIG. 1) and information (e.g., a power supply identification or "PSID") regarding the electrical energy capabilities of external battery 122 in order that external battery 122 may emulate an AC/DC converter for use with information handling system 102.

Accessory port 126 may comprise any system, device, or apparatus configured to receive a device and electrically couple such device to external battery 122 such that external battery 122 may supply electrical energy to such device. For example, in some embodiments, accessory port 126 may comprise a Universal Serial Bus (USB) port having a connector configured to receive a corresponding connector of a USB device (e.g., a charging cord for a smart phone, personal digital assistant, tablet, etc.).

Charging port 128 may be configured to couple to a source of 120- or 240-volt (or any other suitable voltage) alternating current supplied by a utility company, in order to recharge external battery 122 by reversing the chemical reactions that occur during conversion of the stored chemical energy into electrical energy. In these and other embodiments, charging port 128 may include or be coupled to an AC/DC adapter internal to external battery 122 which may provide electrical energy to devices coupled to main output port 124 and/or accessory port 126.

Controller 132 may include any system, device, or apparatus configured to control and manage delivery of electrical energy from main output port 124 and accessory port 126 and communication of the information regarding the electrical energy delivery capabilities of main output port 124 that may be communicated from main output port 124.

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

In operation, power system 110 of information handling system 102 may recognize (e.g., via PSID or other information indicative of a power supply coupled to DC input 118) whether external battery 122 is coupled thereto, and if so, may receive information from external battery 122 regarding its power delivery capabilities, including the type of power supply (e.g., manufacturer, model, version, etc.) and its continuous power rating. After identifying external battery 122, power system 110 may determine an amount of power to draw from external battery 122 based on its power state (e.g., high-power mode or low-power mode), the state of charge of battery 114, and/or other factors.

In order that power system 110 of information handling system 102 may draw electrical energy from external battery in accordance with the ability of external battery 122 to deliver electrical energy. For example, external battery 122 may operate in a plurality of continuous power modes. As a specific example, in some embodiments, external battery 122 may operate in a maximum continuous power mode, an intermediate continuous power mode, and a nominal continuous power mode. In such embodiments, external battery 122 may operate in a maximum continuous power mode when a power source is coupled to charging port 128, which may be the condition in which external battery 122 is capable of delivering a maximum amount of power to main output port 124. When not coupled to a charging port 128, external battery 122 may operate in an intermediate continuous power mode or a nominal continuous power mode. The intermediate continuous power mode may represent a maximum amount of power that may be delivered from main output port 124 in the absence of a power source coupled to charging port 128. The nominal continuous power mode may represent a minimum amount of power that may be delivered from main output port 124. External battery 122 may operate in the intermediate continuous power mode or the nominal continuous power mode based on one or more operating parameters associated with external battery 122, including without limitation its state of charge, state of health, temperature, and whether devices are also coupled to accessory port 126.

A detailed example of how power system 110 and external battery 122 may interact to carry out their functionality is described in greater detail below with respect to FIGS. 2 through 4.

Figure 2:
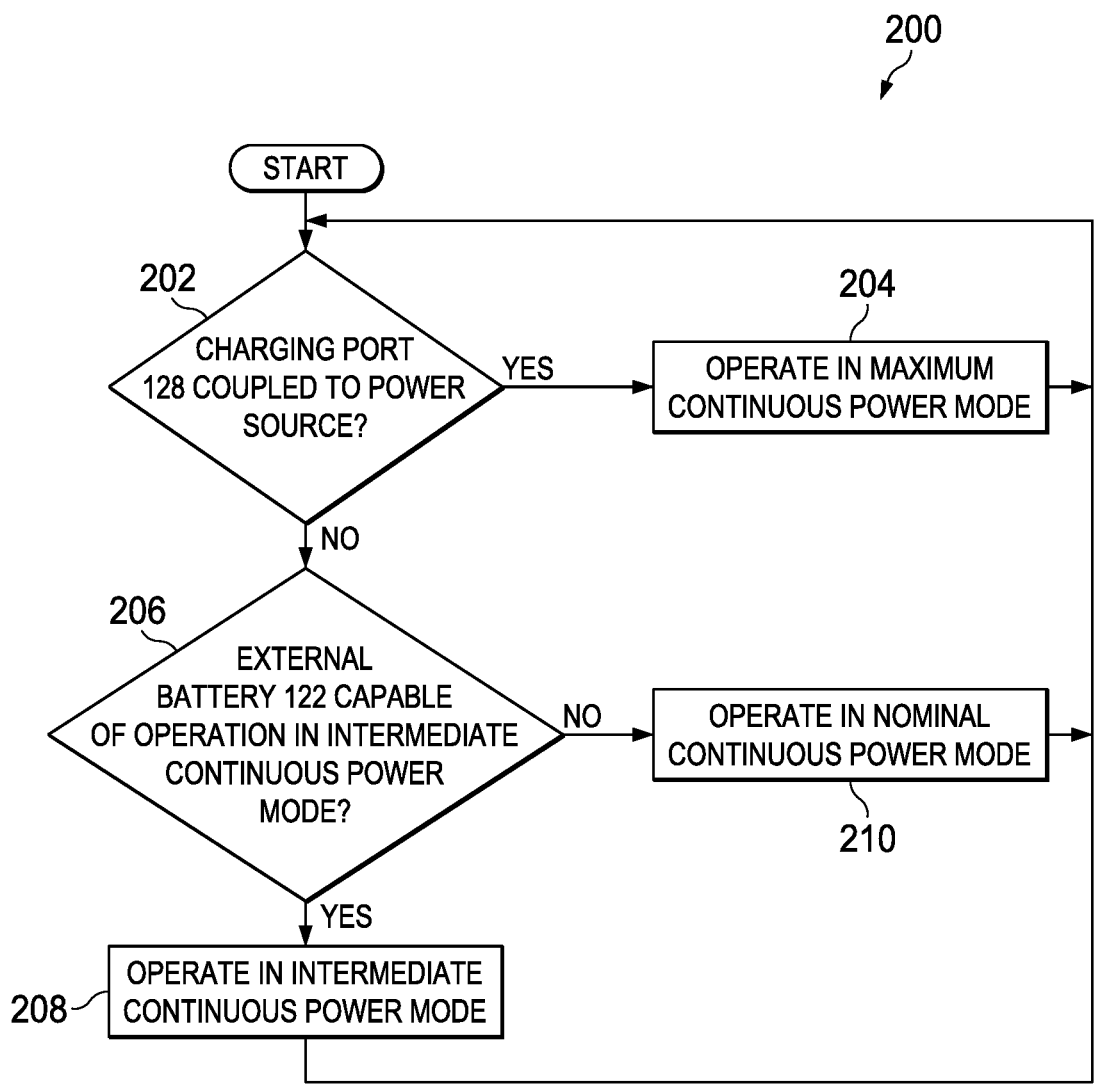
FIG. 2 illustrates a flow chart of an example method for determining a mode of operation for an external battery, in accordance with embodiments of the present disclosure.

FIG. 2 illustrates a flow chart of an example method 200 for determining a mode of operation for an external battery 122, in accordance with embodiments of the present disclosure. According to one or more embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, controller 132 may determine if charging port 128 is coupled to a power source. If charging port 128 is coupled to a power source, method 200 may proceed to step 204. Otherwise method 200 may proceed to step 206.

At step 204, responsive to a determination that charging port 128 is coupled to a power source, controller 132 may cause external battery 122 may operate in a maximum continuous power mode. After completion of step 204, method 200 may proceed again to step 202.

At step 206, controller 122 may determine if external battery 122 is capable of operating in an intermediate continuous power mode. External battery 122 may be able to operate in the intermediate power mode unless a particular power condition exists within external battery 122 requiring operating in the nominal continuous power mode. Such power condition may include, without limitation, a device being coupled to accessory port 126, an increase in temperature of external battery 122 above a threshold temperature, a decrease in the state of charge of external battery 122 below a threshold state of charge, a decrease in the health of external battery 122 below a threshold level of health, other factors, and/or a combination of the foregoing. If external battery 122 is capable of operating in the intermediate continuous power mode, method 200 may proceed to step 208. Otherwise, method 200 may proceed to step 210.

At step 208, in response to determining that external battery 122 is capable of operating in the intermediate continuous power mode, controller 132 may cause external battery to operate in the intermediate continuous power mode. After completion of step 208, method 200 may proceed again to step 202.

At step 210, in response to determining that external battery 122 is incapable of operating in the intermediate continuous power mode, controller 132 may cause external battery to operate in the nominal continuous power mode. After completion of step 208, method 200 may proceed again to step 202.

Method 200 may be implemented using information handling system 102 or any other system operable to implement method 200. In certain embodiments, method 200 may be implemented partially or fully in software and/or firmware embodied in computer-readable media and executable on a processor (e.g., controller 132) of external battery 122.

FIG. 3 illustrates a flow chart of an example method 300 for communicating a signal indicative of a mode of operation of external battery 122, in accordance with embodiments of the present disclosure. According to one or more embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, controller 132 may communicate a signal via main output port 124 indicative of the continuous power mode of external battery 122. Such signal may emulate an analogous signal (e.g., a PSID) that may be typically communicated by an AC/DC adapter in order to indicate to a power system of an information handling system the type of power supply to which it is coupled, such that the power system may draw power based on the continuous power mode of external battery 122. For example, for each continuous power mode of external battery 122, a respective signal may be communicated via main output port 124 indicative of the amount of power (e.g., a continuous power rating) deliverable from external battery in such continuous power mode.

At step 304, controller 132 may determine if there has been a change between continuous power modes of external battery. If a change in continuous power modes has occurred, method 300 may proceed to step 306. If a change has not occurred, method 300 may remain at step 304 until such a change in continuous power modes occurs.

At step 306, in response to a change in continuous power modes, controller 132 may cause external battery to reinitialize. In some embodiments, during such reinitialization, external battery 122 may momentarily cease supplying power via main output port 124 (e.g., may drop a voltage output from output port 124), after which external battery 122 may again supplying power. To a power system of an information handling system, such a reinitialization may appear as an AC/DC adapter being unplugged from a DC input of the information handling system, followed by a different AC/DC adapter being coupled to the DC input (e.g., such that the power system receives a new PSID event). Such reinitialization may thus provide a means indicate a change in continuous power rating (e.g., initialize another PSID event) such that information handling system 102 receives the indication of the new continuous power rating. After completion of step 306, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using external battery 122 or any other system operable to implement method 300. In certain embodiments, method 300 may be implemented partially or fully in software and/or firmware embodied in computer-readable media and executable on a processor (e.g., controller 132) of external battery 122.

Figure 4:
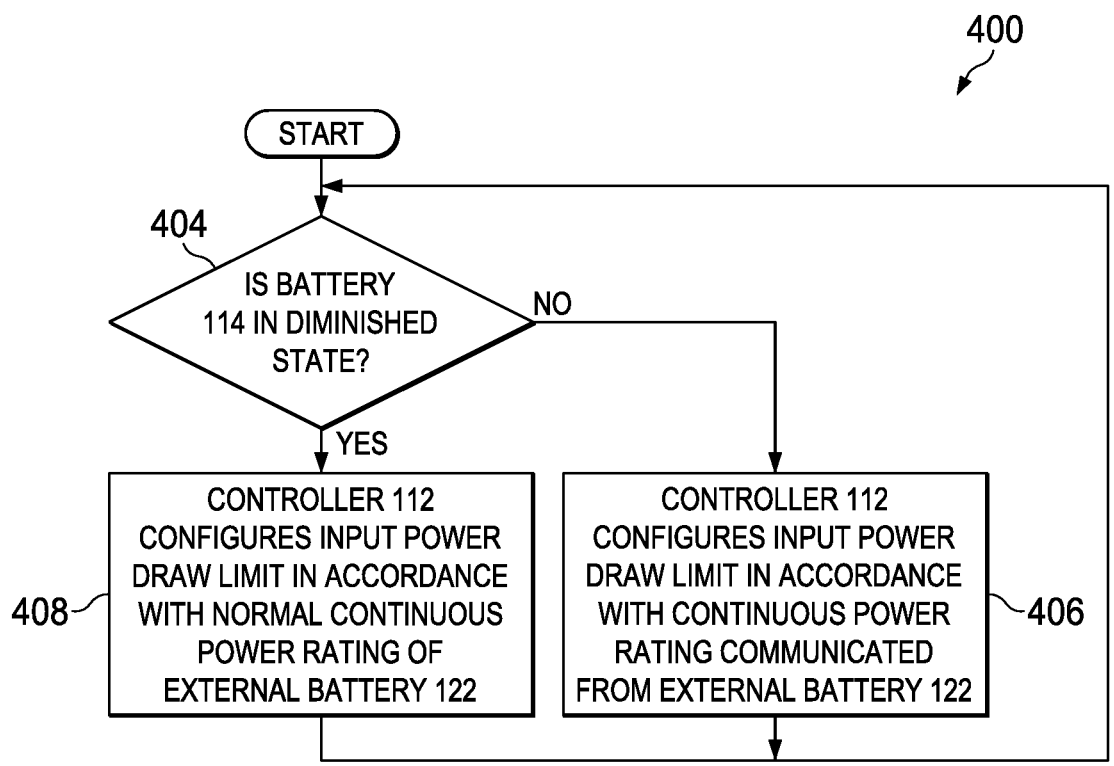
FIG. 4 illustrates a flow chart of an example method for enabling an information handling system to accept variable input power from an external battery, in accordance with embodiments of the present disclosure.

FIG. 4 illustrates a flow chart of an example method 400 for enabling an information handling system to accept variable input power from an external battery, in accordance with embodiments of the present disclosure. According to one or more embodiments, method 400 may begin at step 404. As noted above, teachings of the present disclosure may be implemented in a variety of configurations of system 100. As such, the preferred initialization point for method 400 and the order of the steps comprising method 400 may depend on the implementation chosen.

At step 404, controller 112 may determine whether battery 114 is in a diminished state. Battery 114 may be in a diminished state if battery 114 is present, but in a degraded state, or if battery 114 is not present. Battery 114 may be in a degraded state due to an increase in temperature of battery 114 above a threshold temperature, a decrease in the state of charge of battery 114 below a threshold state of charge, a decrease in the health of battery 114 below a threshold level of health, other factors, and/or a combination of the foregoing. If battery 114 is in a diminished state, such battery 114 may be in a state in which it cannot be relied upon to provide necessary power requirements to information handling resources 116 in the absence of external battery 122 or an AC/DC adapter coupled to DC input 110. For example, below a threshold level of charge, battery 114 may be at a state of charge at which it would momentarily not be able to supply power requirements to information handling resources 116 in the event that external battery 122 were to reinitialize as described with respect to step 306 above. If battery 114 is in a diminished state, method 400 may proceed to step 408. Otherwise, method 400 may proceed to step 406.

At step 406, controller 112 may configure its input power draw limit via DC input 110 in accordance with the continuous power mode communicated from external battery 122, regardless of a continuous power rating associated with such mode. After completion of step 406, method 400 may proceed again to step 404.

At step 408, controller 112 may configure its input power draw limit via DC input 110 in accordance with the continuous power rating of the nominal continuous power mode of external battery 122 (or in accordance with a lower continuous power rating which may be a default power consumption for information handling system 102), regardless of the continuous power mode communication from external battery 122. After completion of step 408, method 400 may proceed again to step 404.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media and executable on a processor (e.g., controller 112) of information handling system 102.

Although the present disclosure has been described in detail, it should be understood that various changes, substitutions, and alterations can be made hereto without departing from the spirit and the scope of the disclosure as defined by the appended claims.

What is claimed is:

1. An external battery for delivering electrical energy to an information handling system via a direct-current input of the information handling system, comprising:
    an output port for delivering the electrical energy to the information handling system and for communicating an indication to the information handling system regarding an electrical energy delivery capacity of the external battery; and
    a controller for controlling the indication, the controller configured to:
        select a mode of operation from among a plurality of modes of operation of the external battery based on one or more operating conditions associated with the external battery; and
        when changing selection of the mode of operation from one mode of operation to another mode of operation, reinitialize the external battery in order to cause the output port to communicate an indication that the external battery is capable of delivering electrical energy in accordance with the mode of operation, wherein reinitializing the external battery comprises causing the output port to momentarily cease supplying electrical energy power via the output port in order to indicate a change in the mode of operation of the external battery.

2. The external battery of claim 1, wherein the one or more operating conditions include at least one of a temperature of the external battery, a state of charge of the external battery, a health of the external battery, and whether the external battery is coupled to a power source for charging the external battery.

3. The external battery of claim 1, further comprising a second output port for delivering electrical energy to a device coupled to the second output port, wherein the one or more operating conditions include at least whether a device is coupled to the second output port.

4. A method comprising:
    selecting a mode of operation of an external battery from among a plurality of modes of operation of the external battery based on one or more operating conditions associated with the external battery; and
    when changing selection of the mode of operation from one mode of operation to another mode of operation, reinitializing the external battery in order to cause an output port of the external battery to communicate an indication that the external battery is capable of delivering electrical energy in accordance with the mode of operation, wherein reinitializing the external battery comprises causing the output port to momentarily cease supplying electrical energy power via the output port in order to indicate a change in the mode of operation of the external battery.

5. The method of claim 4, wherein the one or more operating conditions include at least one of a temperature of the external battery, a state of charge of the external battery a health of the external battery, and whether the external battery is coupled to a power source for charging the external battery.

6. The method of claim 4, wherein the one or more operating conditions include at least whether a device is coupled to a second output port of the external battery for providing electrical energy to a device coupled to the second output port.

* * * * *